(12) United States Patent
Yang et al.

(10) Patent No.: US 12,051,873 B2
(45) Date of Patent: Jul. 30, 2024

(54) ADAPTER INCLUDING SHIELDING GATE ASSEMBLY

(71) Applicant: Suncall Technologies (SZ) Co., LTD, Shenzhen (CN)

(72) Inventors: Xiaotong Yang, Shenzhen (CN); Xiaohui Liu, Shenzhen (CN); Masaya Nakagawa, Shenzhen (CN)

(73) Assignee: SUNCALL TECHNOLOGIES (SZ) CO., LTD, Shenzhen (CN)

( * ) Notice: Subject to any disclaimer, the term of this patent is extended or adjusted under 35 U.S.C. 154(b) by 0 days.

(21) Appl. No.: 18/201,617

(22) Filed: May 24, 2023

(65) Prior Publication Data
US 2023/0299532 A1   Sep. 21, 2023

Related U.S. Application Data (63) Continuation of application No. 17/278,199, filed as application No. PCT/CN2019/106313 on Sep. 18, 2019, now Pat. No. 11,695,232.

(51) Int. Cl.
| | | |
|---|---|---|
| *H01R 13/453* | (2006.01) | |
| *H01R 13/502* | (2006.01) | |
| *H01R 31/06* | (2006.01) | |

(52) U.S. Cl.
CPC ..... *H01R 13/4536* (2013.01); *H01R 13/5025* (2013.01); *H01R 31/06* (2013.01)

(58) Field of Classification Search
CPC .......... H01R 13/4536; H01R 13/5025; H01R 31/06; G02B 6/381; G02B 6/3818
See application file for complete search history.

(56) References Cited

U.S. PATENT DOCUMENTS

| | | | |
|---|---|---|---|
| 3,990,758 A | * | 11/1976 | Petterson ........... H01R 13/4536 439/138 |
| 5,317,663 A | | 5/1994 | Beard et al. |
| 5,506,922 A | | 4/1996 | Grois et al. |
| 5,716,224 A | * | 2/1998 | Masuda ............. H01R 13/4536 439/138 |
| 5,909,526 A | | 6/1999 | Roth et al. |
| 6,425,694 B1 | | 7/2002 | Szilagyi et al. |
| 6,471,412 B1 | | 10/2002 | Belenkiy et al. |

(Continued)

FOREIGN PATENT DOCUMENTS

| | | |
|---|---|---|
| CN | 201781134 U | 3/2011 |
| CN | 203930127 U | 11/2014 |

(Continued)

OTHER PUBLICATIONS

1 International Search Report for Application No. PCT/CN2019/106313 dated Dec. 4, 2019.

*Primary Examiner* — Thanh Tam T Le
(74) *Attorney, Agent, or Firm* — Suiter Swantz IP (57) ABSTRACT

An adapter includes a housing defining an insertion port and a plugging cavity, and a shielding assembly positioned in the adapter. The shielding assembly includes a first and second shielding gates rotatably disposed in the adapter wherein the two shielding gates open and close the insertion port by the second shielding gate abutting against the first shielding gate, and the second shielding gate being inclined relative to vertical when the shielding gates are in a closed state.

20 Claims, 9 Drawing Sheets

(56) References Cited

U.S. PATENT DOCUMENTS

| | | | |
|---|---|---|---|
| 6,685,362 B2 * | 2/2004 | Burkholder | G02B 6/3849 439/607.34 |
| 6,712,523 B2 | 3/2004 | Zimmel | |
| 6,715,928 B1 | 4/2004 | Matasek et al. | |
| 7,144,163 B2 | 12/2006 | Tanaka et al. | |
| 7,211,729 B1 * | 5/2007 | Yang | H01R 13/4536 174/67 |
| 7,233,731 B2 | 6/2007 | Solheid et al. | |
| 7,264,401 B2 | 9/2007 | Johnson | |
| 7,340,146 B2 | 3/2008 | Lampert et al. | |
| 7,384,200 B2 | 6/2008 | Nakagawa | |
| 7,785,018 B2 | 8/2010 | Jones et al. | |
| 8,192,091 B2 | 6/2012 | Hsu et al. | |
| 8,794,851 B2 | 8/2014 | Jibiki et al. | |
| 9,134,486 B2 | 9/2015 | Tseng | |
| 9,229,177 B1 | 1/2016 | Sato | |
| 9,285,548 B2 | 3/2016 | Lin et al. | |
| 9,383,523 B2 | 7/2016 | Liu | |
| 9,453,963 B2 * | 9/2016 | Sato | G02B 6/241 |
| 9,470,849 B2 | 10/2016 | Wong et al. | |
| 9,494,746 B2 * | 11/2016 | Sanders | G02B 6/3897 |
| 9,547,134 B2 | 1/2017 | Liu | |
| 10,073,225 B2 | 9/2018 | Weiland et al. | |
| 10,295,752 B2 | 5/2019 | Zhu et al. | |
| 10,424,863 B1 | 9/2019 | Zhuang et al. | |
| 10,439,346 B2 | 10/2019 | He | |
| 10,502,903 B1 | 12/2019 | Wang et al. | |
| 10,502,904 B2 | 12/2019 | Yang | |
| 10,700,479 B1 | 6/2020 | Smith et al. | |
| 10,852,486 B2 * | 12/2020 | Hsu | G02B 6/3865 |
| 11,054,582 B2 | 7/2021 | Yang | |
| 11,262,510 B2 | 3/2022 | Wong et al. | |
| 2006/0169856 A1 | 8/2006 | Dorenkamp et al. | |
| 2015/0011874 A1 | 1/2015 | Amoako-Tuffour et al. | |

FOREIGN PATENT DOCUMENTS

| | | |
|---|---|---|
| CN | 206041151 U | 3/2017 |
| CN | 206947619 U | 1/2018 |
| CN | 207037650 U | 2/2018 |
| CN | 207249188 U | 4/2018 |
| CN | 108832370 A | 11/2018 |
| CN | 208835347 U | 5/2019 |
| JP | 2012226267 A | 11/2012 |

* cited by examiner

FIG. 16

ADAPTER INCLUDING SHIELDING GATE ASSEMBLY

RELATED APPLICATIONS AND INCORPORATION BY REFERENCE

This application claims the benefit of priority of U.S. application Ser. No. 17/278,199 filed Mar. 19, 2021, which is a US National Stage entry of PCT/CN2019/106313 filed Sep. 18, 2019, which claims the benefit of priority of Chinese Application No. CN 201811108946.4 filed Sep. 21, 2018, which are hereby incorporated by reference in their entirety.

TECHNICAL FIELD

The present disclosure relates to the technical field of optical communications, for example, an adapter.

BACKGROUND

An adapter is an interface converter, and the adapter may be an independent hardware interface device and allows hardware or an optical communication interface to be connected to other hardware or optical communication interfaces, or the adapter may also be an information interface. Common adapters include a power adapter and an optical fiber adapter.

The adapter needs to be installed on an installation frame through an elastic component and a blocking structure disposed on the own housing of the adapter. The installation frame is usually a hollow panel in a shape of a hollow square. The elastic component is installed on the housing of the adapter. The housing is fixedly provided with a blocking portion. The elastic component and the blocking portion form a clamping position. However, due to different stacking methods, the adapter usually has two structures. One is that blocking portions are disposed on the left and right sides of the housing of the adapter, and another is that the blocking portions are disposed on the upper and lower sides of the housing of the adapter. In this manner, two types of molds and production lines of the housing of the adapter are required, which greatly increases the production costs. Moreover, adapters of the same housing may be stacked only in an up-and-down direction or only in a left-and-right direction, and thus the application range is small.

SUMMARY

The present disclosure provides an adapter. The adapter includes a housing and an elastic component. The elastic component is configured to connect the housing with an installation frame. The elastic component includes an installation body, a blocking portion and a clamping elastic piece, the blocking portion and the clamping elastic piece are disposed on the installation body. The installation body is configured to be detachably connected to the housing. A first clamping gap capable of accommodating the installation frame is provided between the blocking portion and the clamping elastic piece.

REFERENCE LIST 100 housing
200 elastic component
300 door body
400 first shielding gate
500 second shielding gate
600 first elastic component
700 second elastic component
110 body accommodation groove
120 clamping portion
130 plugging cavity
140 plugging port
150 door body accommodation groove
160 second clamping portion
170 fourth clamping portion
131 maintenance port
132 insertion port
151 side plate accommodation groove
210 installation body
220 blocking portion
230 clamping elastic piece
240 first clamping gap
250 guiding elastic piece
260 connecting piece
270 clamping piece
211 body plate
212 clamping plate
213 connecting portion
214 second clamping gap 231 inclined piece
232 abutting piece
251 tilted piece
252 flat piece
310 reinforcing rib
311 first clamping protrusion
312 second clamping protrusion
313 main door plate
314 side door plate
315 third clamping portion
410 rotary shaft installation portion
420 shaft hole
430 guiding hole
440 first body
421 upper arc segment
422 lower arc segment
423 limiting arc segment
710 first elastic piece
720 second elastic piece
721 light-transmitting through hole

DETAILED DESCRIPTION

The solutions of the present disclosure are described hereinafter through embodiments in conjunction with drawings.

An embodiment of the present disclosure provides an adapter. As shown in FIGS. 1 to 3 and FIG. 5, the adapter includes a housing 100 and an elastic component 200. Generally, the housing 100 is roughly rectangular, but is not limited to a rectangular block shape. The elastic component 200 is configured to connect the housing 100 with an installation frame (not shown in the figure). The elastic component 200 includes an installation body 210, a blocking portion 220 and a clamping elastic piece 230, and the blocking portion 220 and the clamping elastic piece 230 are disposed on the installation body 210. The installation body 210 is detachably connected to the housing 100. A first clamping gap 240 capable of accommodating the installation frame is provided between the blocking portion 220 and the clamping elastic piece 230. The thickness of the first clamping gap 240 is equal to or slightly less than the thickness of a to-be-clamped part of the installation frame. The elastic component 200 may be an integrally formed piece, but is not limited to an integrally formed piece. That is, if the elastic component 200 is not an integrally formed piece, the blocking portion 220 may be elastic. To make the appearance more beautiful, the housing 100 is provided with a body accommodation groove 110 capable of accommodating the installation body 210, and the shape of the body accommodation groove 110 is adapted to the shape of the installation body 210.

In the adapter provided in this embodiment, the elastic component 200 is directly provided with a clamping position formed by the blocking portion 220 and the clamping elastic piece 230. When the upper and lower surfaces or the left and right surfaces of the housing 100 need to be connected to the installation frame, different (different specific structures and/or sizes) elastic components 200 may be directly selected and installed on the upper and lower surfaces or the left and right surfaces of the housing 100. Due to the low processing costs of the elastic component 200, the production costs of the adapter may be greatly reduced. Moreover, the same adapter may be stacked in an up-and-down direction or in a left-and-right direction, which has a wider application range.

The structure and the installation method of the installation body 210 are not limited. In an embodiment, as shown in FIGS. 1 to 4, two elastic components 200 are split structures, an installation body 210 of each of the two elastic components 200 includes a body plate 211 and clamping plates 212 that are perpendicular to the body plate 211, and the clamping plates 212 are disposed on two sides of the body plate 211, respectively. The body plate 211 and the two clamping plates 212 form a clamping structure capable of clamping the housing 100. The distance between the two clamping plates 212 may be equal to or slightly less than the thickness of a to-be-clamped part of the housing 100 between the two clamping plates 212 so that the housing 100 can be clamped tightly, that is, the installation body 210 is roughly a U-shaped elastic clamp. To facilitate the elastic deformation of the blocking portion 220 for clamping, the body plate 211 may also be U-shaped, and end portions of two side walls of the U-shaped body plate 211 are both bent upward (being upward means pointing away from the housing 100) to form the blocking portions 220.

Figure 5:
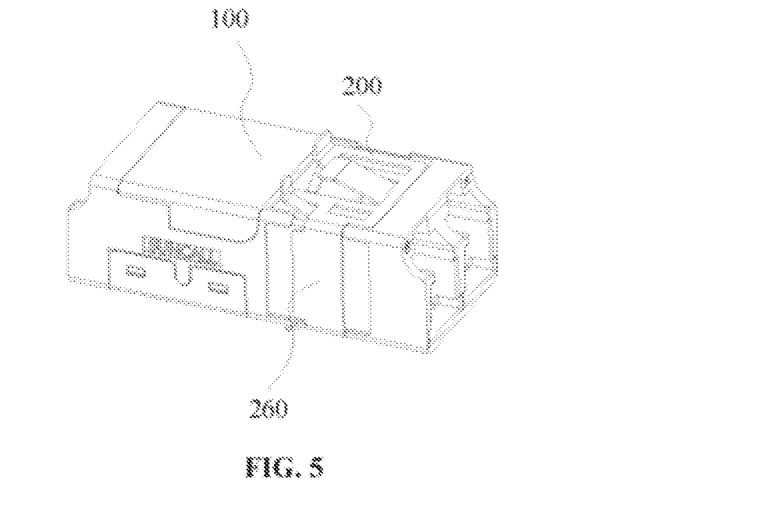
FIG. 5 is an axonometric drawing of the adapter provided with the elastic components on upper and lower sides of the housing according to an embodiment of the present application.
Figure 6:
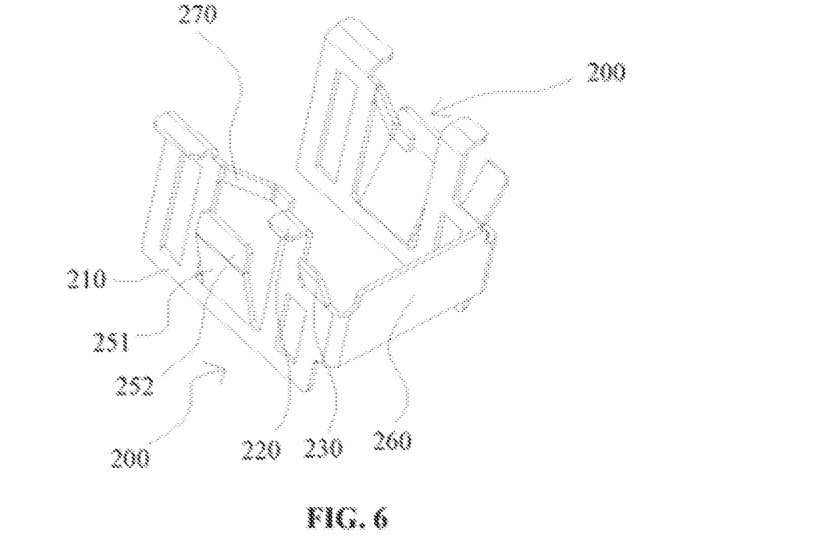
FIG. 6 is a structure view of a second elastic component according to an embodiment of the present application.

In another embodiment, as shown in FIGS. 5 and 6, two elastic components 200 may be an integrated structure. Each of two sides of the housing 100 is provided with an elastic component 200, the installation bodies 210 of the elastic components 200 on the two sides of the housing 100 are connected by a connecting piece 260, and the installation bodies 210 on two sides of the housing 100 form a clamping structure with the connecting piece 260. The distance between the two installation bodies 210 may be equal to or slightly less than the thickness of the to-be-clamped part of the housing 100 between the two installation bodies 210 so that the housing 100 can be clamped tightly. As shown in FIG. 6, the clamping structure formed by the installation bodies 210 of the elastic components 200 on the two sides of the housing 100 and the connecting piece 260 is roughly a U-shaped plate, but is not limited to a U-shaped plate. End portions of two side walls of the clamping structure are both bent upward (being upward means pointing away from the housing 100) to form blocking portions 220 of the elastic components 200 on the two sides of the housing 100.

Figure 3:
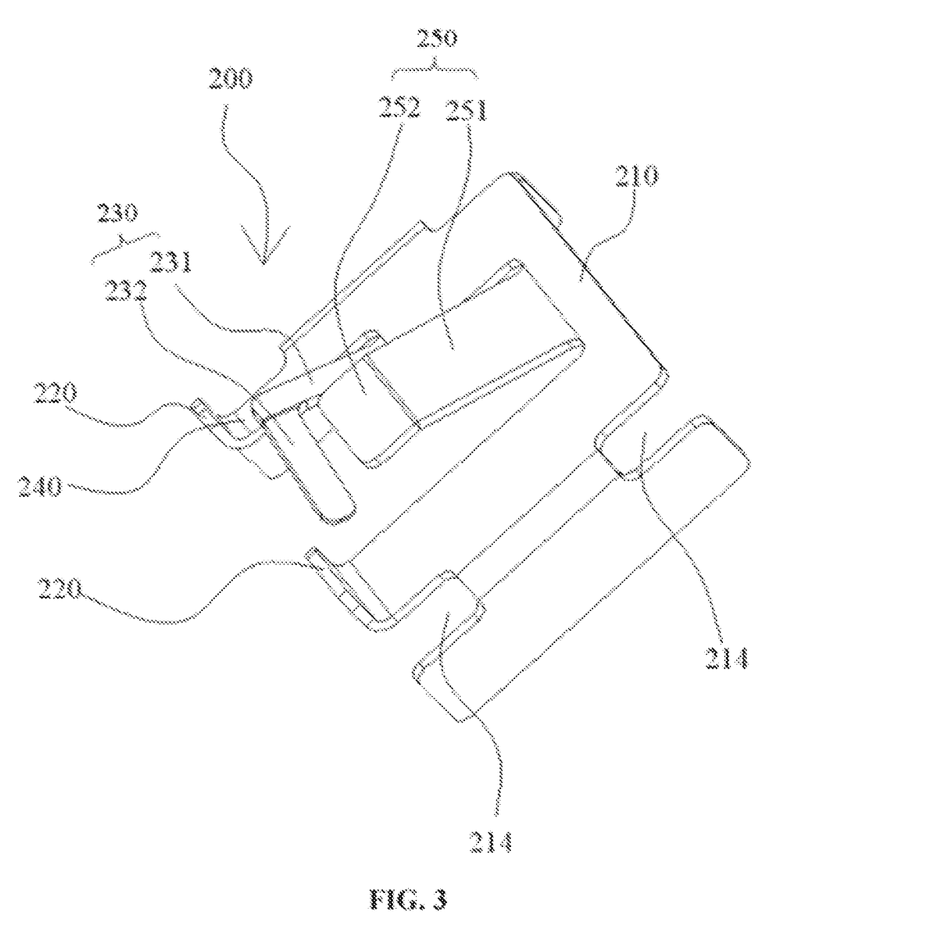
FIG. 3 is a first structure view of a first elastic component according to an embodiment of the present application.
Figure 4:
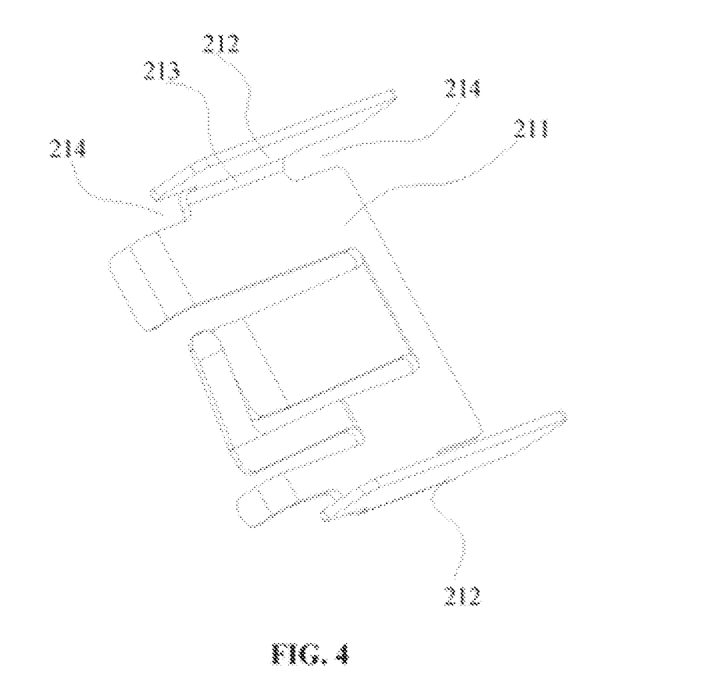
FIG. 4 is a second structure view of the first elastic component according to an embodiment of the present application.

With continued reference to FIGS. 3, 4, and 6, one end of the clamping elastic piece 230 may be connected to the installation body 210, but is not limited to being connected to the installation body 210, and another end of the clamping elastic piece 230 is suspended to facilitate the elastic deformation of the clamping elastic piece 230. For example, in FIGS. 3 and 4, one end of the clamping elastic piece 230 is connected to a groove wall of the U-shaped body plate 211; in FIG. 6, one end of the clamping elastic piece 230 is connected to a groove wall of the U-shaped installation body 210. As shown in FIGS. 3 and 4, the clamping elastic piece 230 includes an inclined piece 231 and an abutting piece 232. The inclined piece 231 is disposed obliquely relative to the body plate 211. Two ends of the inclined piece 231 are connected to the body plate 211 and the abutting piece 232, respectively. The abutting piece 232 is configured to abut against the blocking portion 220, that is, the clamping elastic piece 230 is roughly L-shaped. Of course, as shown in FIG. 6, the clamping elastic piece 230 is only an inclined elastic piece. It is to be understood that no matter whether two elastic components 200 are an integrated structure or split structures, the clamping elastic piece 230 shown in FIG. 3 or FIG. 6 may be used. As shown in FIG. 6, a clamping piece 270 inclined inward (that is, toward the to-be-clamped housing 100) may further be provided on the installation body 210, one end of the clamping piece 270 is connected to the installation body 210, and another end of the clamping piece 270 is suspended. In an embodiment, the clamping piece 270 includes a first tilted piece inclined inward and a first abutting piece connected to the first tilted piece, and the first abutting piece is configured to abut against the housing 100.

To facilitate the installation of the adapter on the installation frame, the elastic component 200 further includes a guiding elastic piece 250 disposed on the installation body 210. The guiding elastic piece 250 is located on one side of the clamping elastic piece 230 facing away from the blocking portion 220. The guiding elastic piece 250 includes a tilted piece 251 inclined toward the clamping elastic piece 230 and a flat piece 252 connected to a free end of the tilted piece 251. In an embodiment, the tilted piece 251 is connected to a groove bottom of the U-shaped body plate 211 as shown in FIGS. 3 and 4 or connected to a groove bottom of the U-shaped installation body 210 as shown in FIG. 6. The flat piece 252 is roughly parallel to the body plate 211, and the flat piece 252 is roughly flush with or slightly lower than a top portion of the clamping elastic piece 230. The tilted piece 251 may be elastically deformed and play a guiding role, which facilitates the insertion of the guiding elastic piece 250 into the installation frame.

With continued reference to FIGS. 3 and 4, to make the assembly between the installation body 210 and the elastic component 200 more stable, the clamping plate 212 and the body plate 211 are connected by a connecting portion 213. Two ends of the clamping plate 212 protrude from two ends of the connecting portion 213, respectively. A second clamping gap 214 is formed between each of the two ends of the clamping plate 212 and the body plate 211. Two clamping portions 120 are disposed at intervals at the junction of every two side walls of the housing 100, the connecting portion 213 is accommodated between the two clamping portions 120, and the clamping portion 120 may be clamped in the respective second clamping gap 214.

Figure 7:
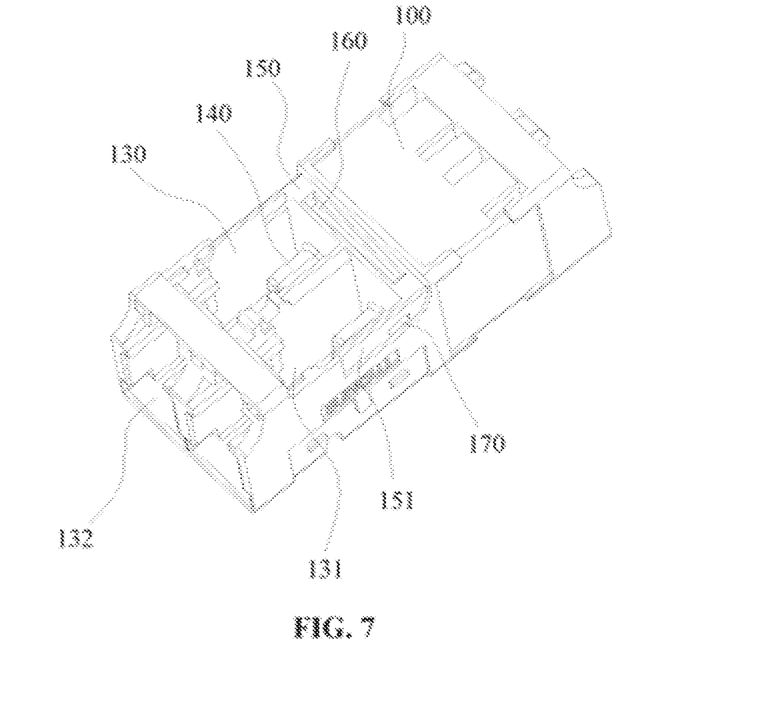
FIG. 7 is a first structure view of the adapter with a door body removed according to an embodiment of the present application.

As shown in FIG. 7, a plugging cavity 130 is provided in the housing 100, and a plugging port 140 capable of being connected to an external device is disposed in the plugging cavity 130. The plugging cavity 130 usually has at least two openings. At least one of the openings is a maintenance port 131 for inspection and cleaning in the plugging cavity 130, and at least one of the openings is an insertion port 132 into which an external joint is inserted such that the external joint is connected to the plugging port 140. The insertion port 132 is usually provided with a shielding gate connected to the housing 100 through a rotary shaft and an elastic component. The shielding gate is opened when the external joint is inserted, and is automatically closed under the action of the elastic component when the external joint is removed to prevent dust from falling onto a plugging joint. The insertion port 132 and the maintenance port 131 are usually configured to be perpendicular to each other.

Figure 1:
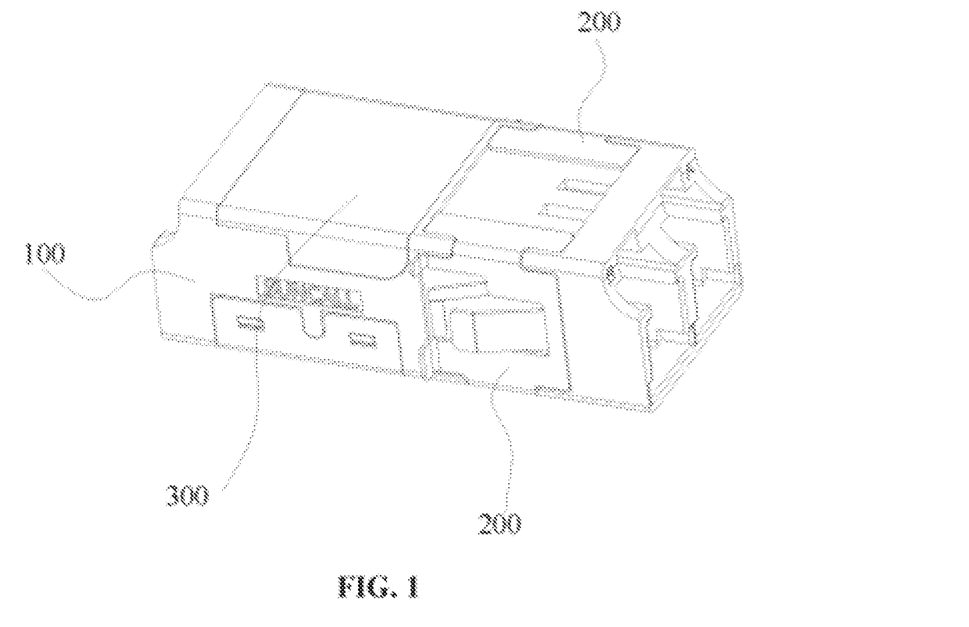
FIG. 1 is an axonometric drawing of an adapter provided with elastic components on left and right sides of a housing according to an embodiment of the present application.
Figure 2:
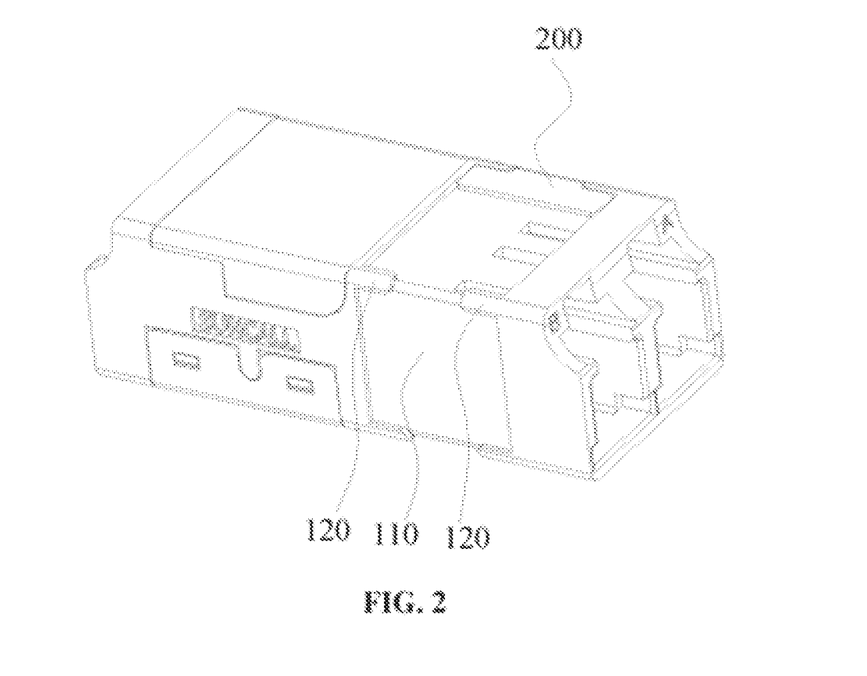
FIG. 2 is a schematic view of the structure of FIG. 1 with one elastic component removed.
Figure 8:
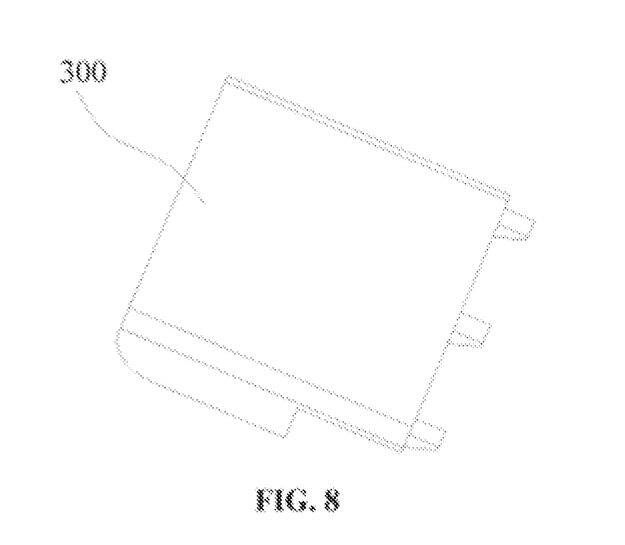
FIG. 8 is a first structure view of the door body according to an embodiment of the present application.
Figure 9:
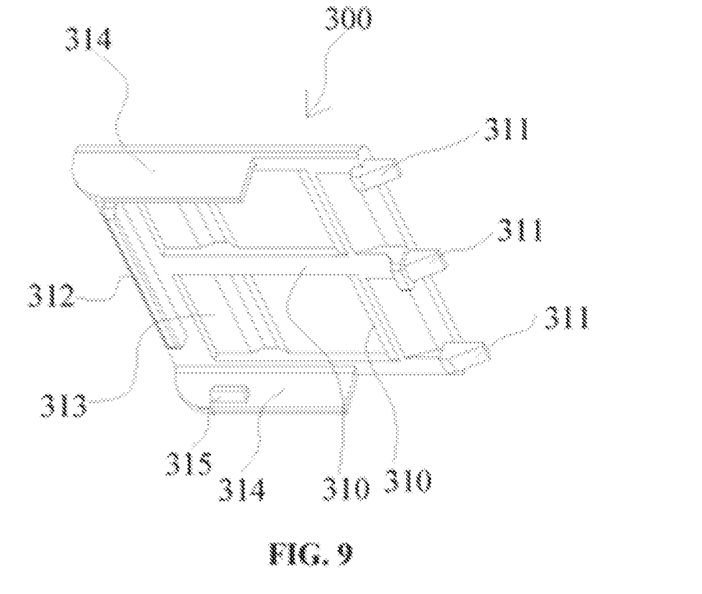
FIG. 9 is a second structure view of the door body according to an embodiment of the present application.

As shown in FIGS. 1, 8, and 9, the adapter provided in this embodiment further includes a door body 300, and the door body 300 is openable and disposed on the housing 100 to open or block the maintenance port 131. In this embodiment, the door body 300 is made of a plastic material, the door body 300 is clamped to the housing 100, and an inner wall of the door body 300 is provided with a reinforcing rib 310. In an embodiment, the reinforcing rib 310 includes a reinforcing rib 310 arranged longitudinally and a reinforcing rib 310 arranged horizontally. The door body 300 is made of a plastic material, which facilitates the coloring of the door body 300 so that the corresponding performance of the adapter may be determined by the color of the door body 300 and the housing 100. The door body 300 is clamped to the housing 100, which facilitates the disassembly and assembly of the door body 300. The reinforcing ribs 310 are disposed on the door body 300 so that the door body 300 meets the strength requirement while the thickness of the door body 300 is not increased. In an embodiment, the housing 100 is provided with a door body accommodation groove 150, and the door body accommodation groove 150 is configured to accommodate the door body 300. An inner contour of the door body accommodation groove 150 may be fitted with an outer contour of the door body 300 so that the appearance is beautiful.

The door body 300 is clamped to the housing 100 in the following manner: each of two ends of the door body 300 is provided with a first clamping portion, and the corresponding position of the housing 100 is provided with a second clamping portion 160 that is fitted with the first clamping portion. To avoid the unsightly appearance caused by the opening on the door body 300, the first clamping portion is a clamping protrusion, and the second clamping portion 160 is a clamping slot. It is to be noted that in other embodiments, the first clamping portion may be provided as a clamping slot, and the second clamping portion 160 may be provided as a clamping protrusion. One end of the door body 300 is provided with a first clamping protrusion 311, another end of the door body 300 is provided with a second clamping protrusion 312, and the clamping direction of the first clamping protrusion 311 is perpendicular to the clamping direction of the second clamping protrusion 312. In an embodiment, the extension direction of the first clamping protrusion 311 is consistent with the extension direction of the door body 300, and the extension direction of the second clamping protrusion 312 is perpendicular to the extension direction of the door body 300. The first clamping protrusion 311 is inserted into the corresponding clamping slot on the housing 100, and then the door body 300 is rotated until the second clamping protrusion 312 is clamped on the housing 100. Multiple first clamping protrusions 311 are provided, and at least one second clamping protrusion 312 is provided.

The first clamping protrusion 311 is usually wedge-shaped, but is not limited to a wedge shape. The second clamping protrusion 312 is usually long-strip-shaped such as rectangular, but is not limited to being long-strip-shaped such as rectangular.

As shown in FIG. 9, to further improve the assembly stability of the door body 300 and the housing 100, the door body 300 includes a main door plate 313 and side door plates 314 r disposed on two sides of the main door plate 313, respectively, each of two side door plates 314 is provided with a third clamping portion 315, and the corresponding position of the housing 100 is provided with a fourth clamping portion 170 that is fitted with the third clamping portion 315. The third clamping portion 315 is a clamping protrusion, and the fourth clamping portion 170 is a clamping slot. In an embodiment, the third clamping portion 315 is disposed on an inner wall of one side door plate 314. It is to be noted that in other embodiments, the third clamping portion 315 may be provided as a clamping slot, and the fourth clamping portion 170 may be provided as a clamping protrusion. To prevent the deformation of the door body 300, the housing 100 is provided with a supporting piece for supporting the main door plate 313.

As shown in FIG. 7, to make the side door plate 314 closely fitted with the housing 100 when the door body 300 is in a closed state, the door body accommodation groove 150 includes a side plate accommodation groove 151 configured to accommodate the side door plate 314, an outer contour of the side door plate 314 coincides with an inner contour of the side plate accommodation groove 151, and an outer contour of one end of the side door plate 314 adjacent to the second clamping protrusion 312 is arc-shaped. In an embodiment, the outer contour of one end of the side door plate 314 adjacent to the second clamping protrusion 312 is in a shape of a quarter arc.

Figure 10:
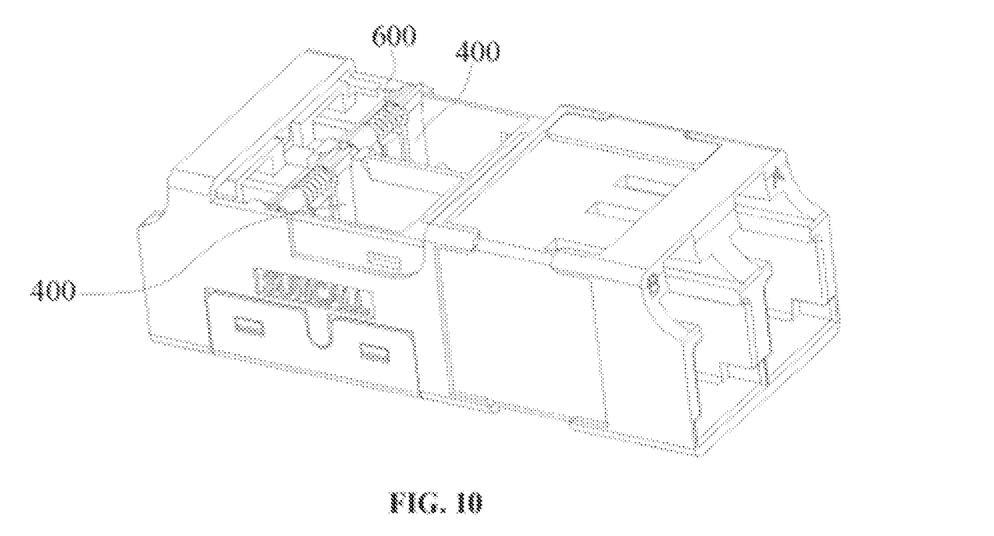
FIG. 10 is a second structure view of the adapter with the door body removed according to an embodiment of the present application.
Figure 11:
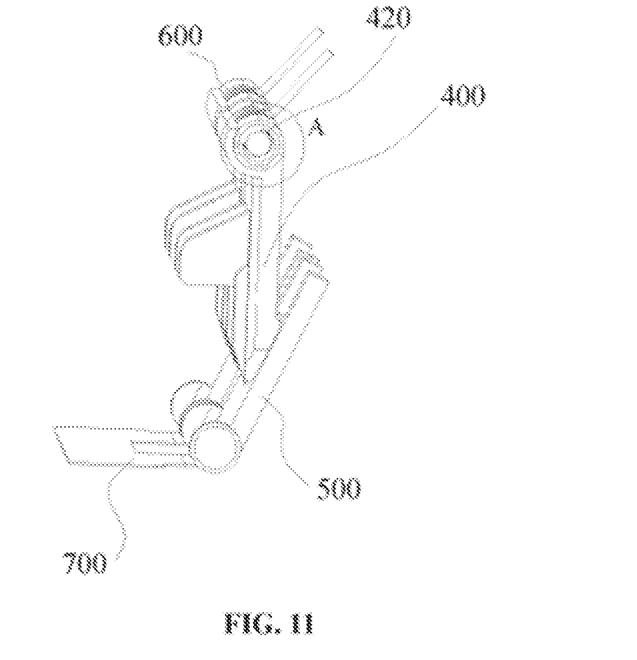
FIG. 11 is a first axonometric view of a first shielding gate and a second shielding gate in a closed state according to an embodiment of the present application.
Figure 13:
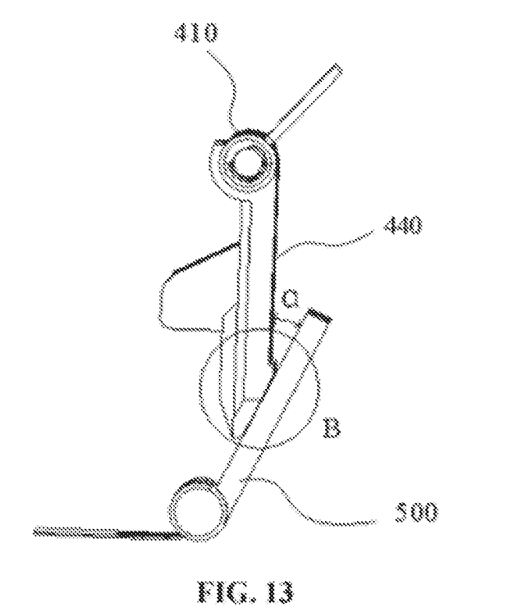
FIG. 13 is a side view of the first shielding gate and the second shielding gate in the closed state according to an embodiment of the present application.

As shown in FIGS. 10, 11, and 13, the insertion port 132 is provided with a first shielding gate 400, a second shielding gate 500, a first elastic component 600, and a second elastic component 700. The first shielding gate 400 and the second shielding gate 500 are rotatably disposed at the plugging cavity 130, and the first shielding gate 400 and the second shielding gate 500 can cooperate with each other to open or block the insertion port 132. The second shielding gate 500 abuts against the first shielding gate 400 when the second shielding gate 500 and the first shielding gate 400 are in a closed state, the second shielding gate 500 and the first shielding gate 400 are disposed at an included angle, and the second shielding gate 500 is inclined toward an inner side of the insertion port 132 relative to the first shielding gate 400. The first shielding gate 400 and the second shielding gate 500 are disposed up and down, and when the second shielding gate 500 and the first shielding gate 400 are in a closed state, a lower end of the first shielding gate 400 abuts against an upper end of the second shielding gate 500. The first elastic component 600 is configured to provide the first shielding gate 400 with an elastic force in the closed state, and the second elastic component 700 is configured to provide the second shielding gate 500 with an elastic force in the closed state. In an embodiment, the elastic force provided by the first elastic component 600 is greater than the elastic force provided by the second elastic component 700. Furthermore, similar to the related art, when the second shielding gate 500 and the first shielding gate 400 are in a closed state, the first shielding gate 400 is roughly perpendicular to the plugging port 140.

In this embodiment, two shielding gates are relatively inclined when the two shielding gates are in a closed state. Therefore, the angle and resilience by which one of the inclined shielding gates needs to be rotated are small, and it is easier to close the shielding gate. In this manner, the following problem can be avoided: two shielding gates in the related art are roughly in a vertical state (that is, the two shielding gates are roughly parallel to each other) and the second elastic component 700 is prone to failure so that the second shielding gate 500 is not tightly closed.

Figure 14:
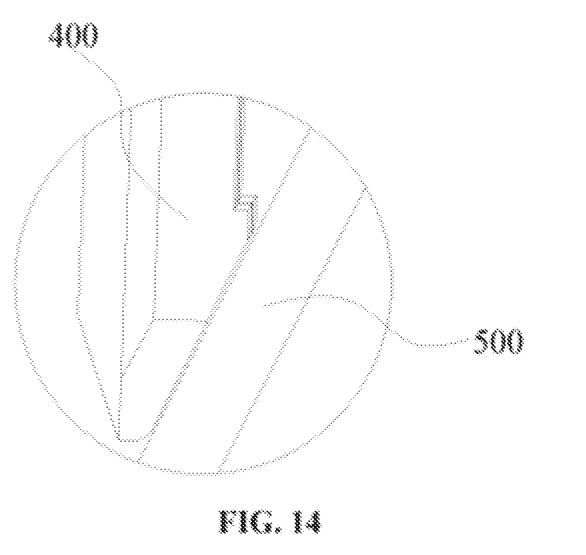
FIG. 14 is a partial enlarged view of a part B of FIG. 13.

As shown in FIG. 14, an end surface of the first shielding gate 400 configured to abut against the second shielding gate 500 is a plane inclined with respect to a first body 440 of the first shielding gate 400. An inclination angle of the plane determines an inclination angle of the second shielding gate 500, and the inclination angle of the inclined plane may be set according to specific requirements. In an embodiment, when the second shielding gate 500 and the first shielding gate 400 are in a closed state, the value range of an included angle α between the second shielding gate 500 and the first shielding gate 400 is 5° to 85°. For example, the included angle α may be 5°, 15°, 25°, 35°, 45°, 55°, 65°, 75°, or 85°.

Figure 15:
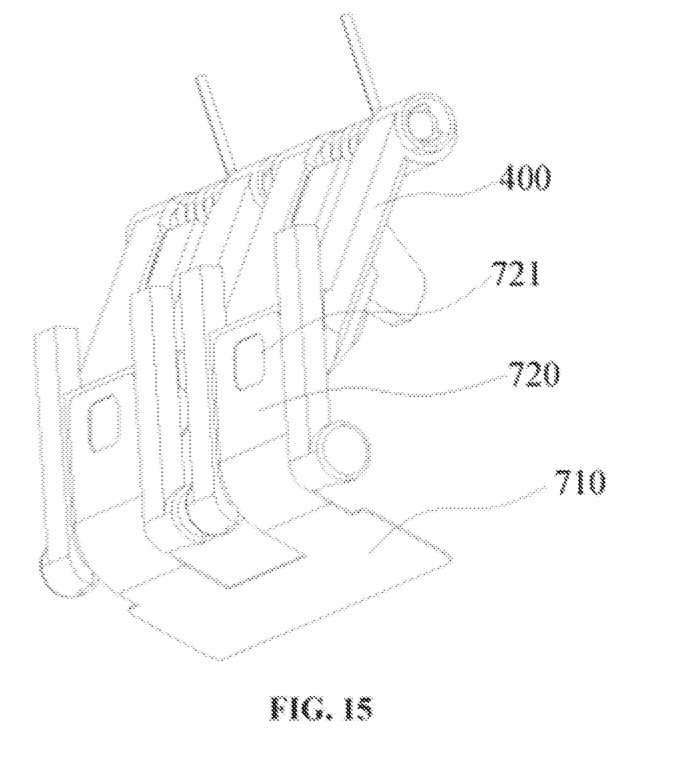
FIG. 15 is a second axonometric view of the first shielding gate and the second shielding gate in the closed state according to an embodiment of the present application.

As shown in FIG. 15, the second elastic component 700 is an elastic piece. The second elastic component 700 includes a first elastic piece 710 and a second elastic piece 720 that are disposed at an included angle and connected to each other. The first elastic piece 710 is connected to the housing 100, and the second elastic piece 720 is connected to an inner wall surface of the second shielding gate 500. The second elastic component 700 is provided as an elastic piece, the thickness occupied by the second elastic component 700 and the overall thickness of the housing 100 of the adapter can be reduced compared with the case where the second elastic component 700 is a torsion spring.

With continued reference to FIG. 15, the second elastic piece 720 is provided with a light-transmitting through hole 721, and the second shielding gate 500 is made of a plastic material. Due to the poor light transmittance of the metal material and the good light transmittance of the plastic material, whether there is light leakage from an insertion cavity is observed at the second shielding gate 500 corresponding to the light-transmitting through hole 721. In an embodiment, the second shielding gate 500 includes a second body and a protrusion disposed on the second body. The protrusion is clamped in the light-transmitting through hole 721 to strengthen the assembly stability of the second shielding gate 500 and the second elastic component 700.

Figure 12:
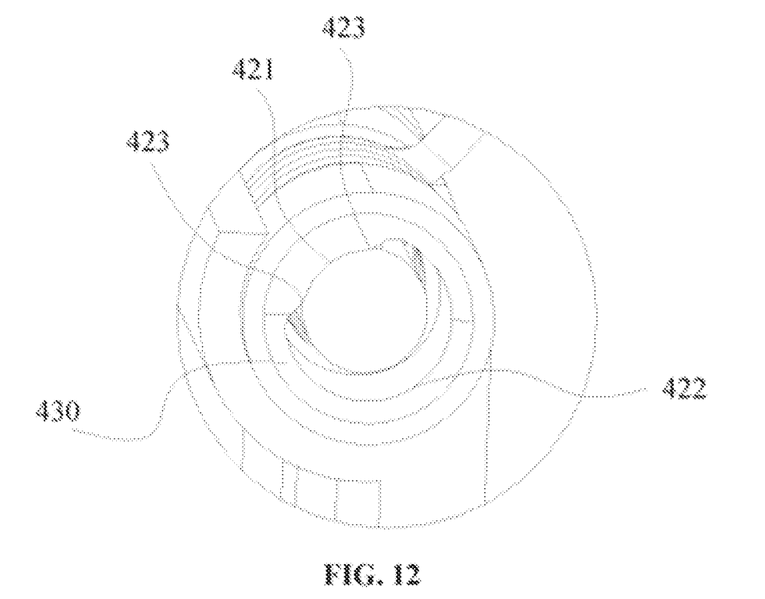
FIG. 12 is a partial enlarged view of a part A of FIG. 11.

The first shielding gate 400 is rotatably installed on the housing 100 through a rotary shaft. Generally, the inner diameter of a shaft hole 420 is slightly greater than the outer diameter of the rotary shaft, which causes the problem of difficult installation of the rotary shaft, the shaft hole 420 is provided for the rotary shaft passing through and disposed on the first shielding gate 400. To solve this problem, as shown in FIGS. 11 to 13, one end of the first body 440 of the first shielding gate 400 facing away from the second shielding gate 500 is provided with a rotary shaft installation portion 410, and the rotary shaft installation portion 410 is provided with a shaft hole 420 through which a rotary shaft passes. An edge of a longitudinal section of the shaft hole 420 includes an upper arc segment 421 and a lower arc segment 422 that protrude outward (outward or inward relative to an inside of the shaft hole 420), and the upper arc segment 421 and the lower arc segment 422 are connected by inwardly protruding limiting arc segments 423. The radius corresponding to the lower arc segment 422 is greater than the radius corresponding to the upper arc segment 421, and the rotary shaft is hung between the upper arc segment 421 and two limiting arc segments 423. The radius corresponding to the upper arc segment 421 is equal to or slightly greater than the outer diameter of the rotary shaft. With this arrangement of the shaft hole 420, the rotary shaft can be easily inserted on the first shielding gate 400. A central angle corresponding to the upper arc segment 421 determines a rotation angle of the first shielding gate relative to the rotary shaft, and the size of the upper arc segment 421 may be set according to specific rotation requirements. To further facilitate the installation of the shaft, an end portion of the rotary shaft installation portion 410 is provided with a guiding hole 430 in communication with the shaft hole 420, and the inner diameter of the guiding hole 430 gradually decreases from outside to inside.

Figure 16:
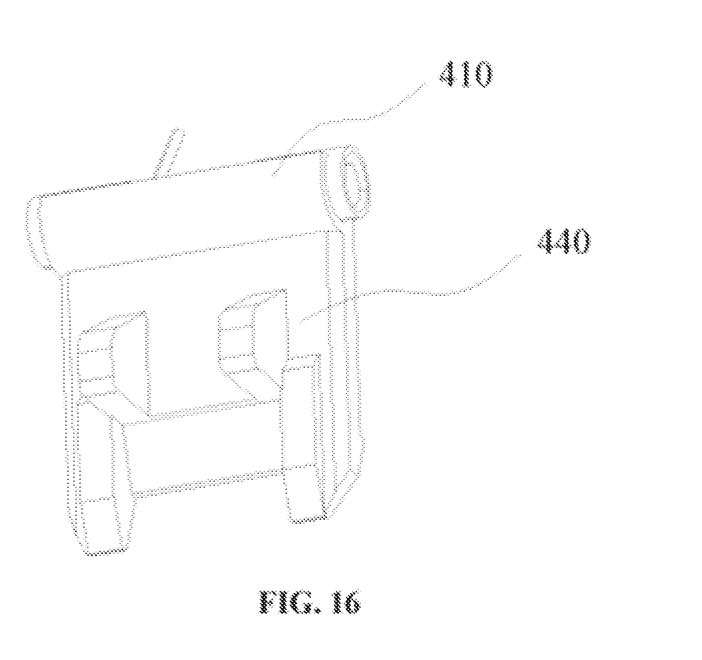
FIG. 16 is an axonometric view of the first shielding gate according to an embodiment of the present application.

To facilitate the installation of the first shielding gate 400 into the plugging cavity 130, as shown in FIG. 16, two sides of the first body 440 may be contracted inward with respect to two sides of the rotary shaft installation portion 410, respectively, that is, the size is reduced relative to a shielding gate body. As shown in FIG. 11, two sides of one end of the first shielding gate 400 adjacent to the second shielding gate 500 are inclined outward in a direction facing away from the second shielding gate 500.

Embodiments of the present disclosure provide an adapter with low production costs and a wide application range. The adapter includes a housing and an elastic component. The elastic component is provided with a clamping position formed by a blocking portion and a clamping elastic piece. When the upper and lower sides or the left and right sides of the housing need to be connected to an installation frame, different sizes of elastic components may be chosen to be installed on the upper and lower sides or the left and right sides of the housing. Due to the low processing costs of the elastic component, the production costs of the adapter may be greatly reduced. Moreover, the same adapter may be stacked in an up-and-down direction or in a left-and-right direction, which has a wider application range.

What is claimed is:

1. An adapter, comprising:
   a housing defining an insertion port and a plugging cavity; and
   a shielding assembly positioned in the adapter, the shielding assembly comprising:
   a first shielding gate rotatably disposed in the adapter; and
   a second shielding gate rotatably disposed in the adapter;
   wherein:
   the first shielding gate and the second shielding gate cooperate to open the insertion port when the shielding assembly is in an open state, and close the insertion port when the shielding assembly is in a closed state;
   the second shielding gate abuts against the first shielding gate when the shielding assembly is in the closed state;
   the second shielding gate is inclined relative to vertical when the shielding assembly is in the closed state; and
   the first shielding gate and the second shielding gate are positioned in overlapping contact such that rotational motion of the first shielding gate to open the insertion port causes rotational motion of the second shielding gate.

2. The adapter according to claim 1, wherein, when the shielding assembly is in the closed state, the second shielding gate is inclined toward an inner side of the insertion port relative to the first shielding gate.

3. The adapter according to claim 1, further comprising:
   a first elastic component coupled to the first shielding gate, the first elastic component configured to bias the first shielding gate toward the closed state of the shielding assembly; and
   a second elastic component coupled to the second shielding gate, the second elastic component configured to bias the second shielding gate toward the closed state of the shielding assembly.

4. The adapter according to claim 3, wherein an elastic force of the first elastic component is greater than an elastic force of the second elastic component.

5. The adapter according to claim 1, wherein, in closed state of the shielding assembly, one end of the first shielding gate abuts against a middle portion of the second shielding gate.

6. The adapter according to claim 1, wherein the first shielding gate is inclined relative to vertical when the shielding assembly is in the closed state.

7. The adapter according to claim 1, wherein, when the shielding assembly is in the closed state:
   an end surface of the first shielding gate abuts against the second shielding gate in a plane inclined with respect to a first body of the first shielding gate; and
   an inclination angle of the plane determines an inclination angle of the second shielding gate.

8. The adapter according to claim 1, wherein, when the shielding assembly is in the closed state, an angle formed between the second shielding gate and the first shielding gate is between 5 degrees and 85 degrees.

9. The adapter according to claim 1, further comprising:
   at least one additional plugging cavity and insertion port defined in the housing; and
   at least one additional shielding assembly positioned in the adapter.

10. The adapter according to claim 1, wherein the first shielding gate defines at least one protrusion that extends, when the shielding assembly is in the closed state, toward the insertion port.

11. The adapter according to claim 1, wherein the second shielding gate defines a light-transmitting through hole.

12. An adapter, comprising:
    a housing defining a first insertion port and a second insertion port positioned side-by-side, each of the first insertion port and the second insertion port leading into a respective plugging cavity;
    a first shielding assembly positioned at an interface between the first insertion port and the respective plugging cavity of the first shielding assembly;
    a second shielding assembly positioned at an interface between the second insertion port and the respective plugging cavity of the second shielding assembly; and
    each of the first shielding assembly and the second shielding assembly, comprising:
    a first shielding gate rotatably disposed in the adapter; and
    a second shielding gate rotatably disposed in the adapter;
    wherein:
    the first shielding gate and the second shielding gate are configured to move into contact to achieve a closed state, and move out of contact to form an open state;
    the second shielding gate abuts against the first shielding gate when in the closed state;
    the second shielding gate is inclined relative to vertical when in the closed state; and
    the first shielding gate and the second shielding gate are positioned in overlapping contact such that rotational motion of the first shielding gate to open the insertion port causes rotational motion of the second shielding gate.

13. The adapter according to claim 12, wherein, when in the closed state, the second shielding gate is inclined toward an inner side of a respective one of the first insertion port and the second insertion port relative to the first shielding gate.

14. The adapter according to claim 12, each of the first shielding assembly and the second shielding assembly further comprising:
    a first elastic component coupled to the first shielding gate, the first elastic component configured to bias the first shielding gate toward the closed state; and
    a second elastic component coupled to the second shielding gate, the second elastic component configured to bias the second shielding gate toward the closed state.

15. The adapter according to claim 14, wherein an elastic force of the first elastic component is greater than an elastic force of the second elastic component.

16. The adapter according to claim 12, wherein, in closed state, one end of the first shielding gate abuts against a portion of the second shielding gate.

17. The adapter according to claim 12, wherein the first shielding gate is inclined relative to vertical in the closed state.

18. The adapter according to claim 12, wherein, when in the closed state:
- an end surface of the first shielding gate abuts against the second shielding gate in a plane inclined with respect to a first body of the first shielding gate; and
- an inclination angle of the plane determines an inclination angle of the second shielding gate.

19. The adapter according to claim 12, wherein, when in the closed state, an angle formed between the second shielding gate and the first shielding gate is between 5 degrees and 85 degrees.

20. The adapter according to claim 12, wherein the first shielding gate defines at least one protrusion that extends, when in the closed state, toward the respective one of the first insertion port and the second insertion port.

* * * * *